United States Patent [19]

Stove

[11] Patent Number: 5,270,720
[45] Date of Patent: Dec. 14, 1993

[54] FMCW RADAR RANGE CALIBRATION

[75] Inventor: Andrew G. Stove, Reigate, England

[73] Assignee: U.S. Philips Corporation, New York, N.Y.

[21] Appl. No.: 898,987

[22] Filed: Jun. 15, 1992

[30] Foreign Application Priority Data

Jun. 14, 1991 [GB] United Kingdom ............... 9112838

[51] Int. Cl.$^5$ .......................... G01S 7/40; G01S 13/62
[52] U.S. Cl. .................................. 342/174; 342/114
[58] Field of Search ............... 342/174, 105, 114, 128

[56] References Cited

U.S. PATENT DOCUMENTS

| Re. 33,055 | 9/1989 | Labbé et al. | 342/99 |
|---|---|---|---|
| 3,611,377 | 10/1971 | Rittenbach | 342/128 |
| 3,634,860 | 1/1972 | Rittenbach | 342/109 |
| 3,727,221 | 4/1973 | Julier et al. | 342/80 |
| 3,750,170 | 7/1973 | Brown | 342/115 |
| 4,008,475 | 2/1977 | Johnson | 342/83 |
| 4,134,113 | 1/1979 | Powell | 342/25 |
| 4,367,473 | 1/1983 | Marin et al. | 342/87 |
| 4,396,916 | 8/1983 | Schnerk | 342/103 |
| 4,621,705 | 11/1986 | Etoh | 180/169 |
| 4,633,253 | 12/1986 | Stove et al. | 342/162 |
| 4,670,845 | 6/1987 | Etoh | 364/461 |
| 4,672,381 | 6/1987 | Labbé et al. | 342/99 |
| 4,733,237 | 3/1988 | Apostolos et al. | 342/13 |

FOREIGN PATENT DOCUMENTS 0145989 11/1984 European Pat. Off. .
0146851 12/1984 European Pat. Off. .
2172461 9/1986 United Kingdom .

Primary Examiner—John B. Sotomayor
Attorney, Agent, or Firm—Robert J. Kraus

[57] ABSTRACT

An FMCW radar transmits a signal the frequency of which repeatedly sweeps upwards and downwards at a rate $\alpha$. Any target returns are applied to a mixer (6) which is also supplied with a sample of the transmitted signal. During each sweep the mixer output signal is therefore a beat frequency signal the frequency components of which correspond to respective targets. The spectrum of the beat frequency signal is analysed by an FFT-calculating arrangement (16) and the result is applied to a data processor (18) which calculates the ranges of the targets. The constant of proportionality between beat frequency and range is inversely proportional to $\alpha$, which is subject to uncertainty. In order to resolve this uncertainty, or correct $\alpha$ to the required value, the velocity of a given radially moving target is calculated in two different ways: from the perceived Doppler shift and from the rate of charge of the beat frequency component due to that target, only one of these being a function of $\alpha$.

5 Claims, 3 Drawing Sheets

FMCW RADAR RANGE CALIBRATION

BACKGROUND OF THE INVENTION

This invention relates to radar apparatus comprising a transmitter for a radio signal the frequency of which repeatedly sweeps from a first frequency to a second frequency at a first substantially constant rate and also sweeps from a third frequency to a fourth frequency at a substantially constant rate which has the same magnitude as, but is of opposite sign to, said first substantially constant rate, a mixer for mixing any return signal received back at the apparatus after reflection by a target or targets with a sample of the transmitted signal to produce a beat signal the frequency spectrum of which has a component corresponding to the or each target, a frequency analyser for analysing said frequency spectrum to determine the frequency of the or each said component, and means for determining the difference between the frequencies of the component corresponding to a given radially moving target arising from a sweep in the frequency of the transmitted signal from the first frequency to the second frequency and the component corresponding to the same target arising from a sweep in the frequency of the transmitted signal from the third frequency to the fourth frequency Apparatus of this general kind is known from, for example, GB-B-2172461. If one considers merely the frequency sweeps of the transmitted signal from the first frequency to the second frequency, and reflection by a single stationary target, then the result of the mixing process is a beat frequency signal (constant if sweep end effects are neglected) the frequency f of which is proportional to the target range r. In fact $r = cf/2a$ where c is the velocity of light and $a$ is the rate of change of frequency of the transmitted signal during each sweep. Analysis of the frequency spectrum of the beat frequency signal will therefore yield information about the range r of the target. If, however, the target is moving in such a manner that it has a component of motion towards or away from the radar apparatus the frequency of the reflected signal will be respectively greater than or less than it would be if the target were stationary, due to the Doppler effect. If the frequency sweeps of the transmitted signal are, for example, in an upward direction, this will result in the frequency of the beat frequency signal being respectively less than or greater than it would be if the target were stationary. This means that it is possible for a stationary target at a given range, a target at a greater range which is moving towards the radar, and a target at a shorter range which is moving away from the radar to all give rise to beat frequency signals having the same frequency; the relationship between this frequency and the actual range of the relevant target is uncertain due to the unknown Doppler frequency shift $f_d$. In fact $$r = cf_r/2a \quad (1)$$
$$= c(f_1 + f_d)/2a \quad (1A)$$

if the frequency sweeps of the transmitted signal are in an upward direction, and $$r = c(f_2 - f_d)/2a \quad (1B)$$

if the frequency sweeps of the transmuted signal are in a downward direction, where $f_1$ and $f_2$ are the beat frequencies obtained in the respective cases, $f_r$ is the portion of these beat frequencies due to the range r, and c and $a$ have the same meanings as defined hereinbefore. This uncertainty can be resolved, as is known, by sweeping the frequency of the transmitted energy in both directions. Provided that the centre frequencies $f_o$ of the upwards and downwards sweeps are the same the mean Doppler frequency shifts $f_d$ due to a given moving target will be the same in both cases. However, as will be seen from equations 1A and 1B, their effects on the frequencies of the beat frequency signals obtained will be oppositely directed in the two cases, so that, provided that the upward and downward sweep rates are the same, the actual range of the target can be determined by taking the average of the beat frequencies $f_1$ and $f_2$ respectively obtained in the two cases, and/or the actual Doppler shift, and hence the actual radial velocity v of the target, can be determined by taking (half) the difference between the beat frequencies obtained in the two cases. Expressed mathematically:

$$2r = c(f_1 + f_d)/2a + c(f_2 - f_d)/2a.$$

$$\text{or } r = c(f_1 + f_2)/4a \quad (2)$$

and $$v = cf_d/2f_o \quad (3)$$
$$= c(f_2 - f_1)/4f_o$$

(For the purpose of (3) the direction of the velocity v has been assumed to be towards the radar apparatus).

The frequency sweeps of the transmitted signal are normally obtained by deriving this signal from a voltage-controlled oscillator (VCO) or the like, the control input of this oscillator being fed with voltage ramps from the output of a sawtooth or triangular wave generator, for example a periodically reset integrator circuit fed with a constant predetermined input voltage or a simple integrator circuit fed with first and second predetermined input voltages alternately. The value of the or each predetermined input voltage together with the time constant of the integrator circuit then determines the slope of each voltage ramp and hence, via the frequency-versus-control-voltage characteristic of the oscillator, the rate of change $a$ of the oscillator output frequency during each frequency sweep. Whilst it is not too difficult to set and maintain the slopes of the voltage ramps generated by such circuits at the required value over considerable periods of time, stability of the frequency-versus-control-voltage characteristic of a VCO over comparable periods of time is much harder to achieve, with the result that the rate of change $a$ of the oscillator output signal may vary in an unpredictable manner. As this factor $a$ appears in the equation relating target range to beat frequency or frequencies obtained, this relationship may also vary in an unpredictable manner so that inaccuracies occur in the target ranges measured by the radar apparatus. It is an object of the invention to mitigate this problem.

SUMMARY OF THE INVENTION

According to one aspect of the invention radar apparatus of the kind defined in the first paragraph is characterized in that it further includes calibration means for determining the constant of proportionality between the range of a target and the range-dependent portion of the frequency of the or each said component corresponding to that target, said calibration means comprising means for determining the rate of change of the frequency of at least one of the components corresponding to said given target and determining said constant as being the ratio between the radial velocity of said given target as indicated by said difference and said rate of change. (Conveniently, the third frequency may be equal to the second frequency and the fourth frequency may be equal to the first frequency).

As mentioned in GB-B-2172461, it is possible to determine the radial velocity of a target by means of a radar apparatus of the kind defined in the first paragraph by a method other than determining the Doppler frequency shift $f_d$. More particularly the rate of change $df/dt$ of the beat frequency corresponding to that target is itself a measure of the radial velocity. If one starts from the equation (1A) or (1B) quoted previously, writes the relevant beat frequency $f_1$ or $f_2$ as $f$, and assumes that the target radial velocity $v$ and hence the Doppler shift $f_d$ is sensibly constant for a period of time during which $df/dt$ is measured, then $$dr/dt = -v = c(df/dt)/2\alpha \qquad (4)$$

$$\text{or } c/2\alpha = -v/(df/dt) \qquad (5)$$

But, as set forth hereinbefore in equation (1), $c/2\alpha$ is the constant of proportionality between the range-dependent portion $f_r$ of the beat frequency corresponding to a target at a given range and the actual range $r$, so that equation (1) can be written alternatively as $$r = -f_r v/(df/dt) \qquad (6)$$

If the actual value of $v$ for the relevant target is determined by employing frequency sweeps of the transmitted signal in both directions and determining the difference between the respective beat frequencies obtained then, combining equations (3) and (6):

$$r = f_r c(f_1 - f_2)/4 f_o (df/dt) \qquad (7)$$

Thus the constant of proportionality between $r$ and $f_r$ has been determined in a manner which entails no assumptions about the value of the frequency sweep rate $\alpha$ (albeit at the price of requiring an assumption about the value of the mean frequency $f_o$ of the transmitted signal during the frequency sweeps in either direction). In practice it will often be possible to obtain a much higher degree of knowledge of, and stability in, the value of $f_o$ than the value of $\alpha$, so the dependence of the constant of proportionality on the value of $f_o$ need not be a significant drawback in many applications.

Once the constant of proportionality has been determined by investigation of a given (radially moving) target in the manner indicated above it can, of course, be used unchanged in the determination of the ranges of other targets, it being only necessary to redetermine the constant when events, such as the elapsing of an appropriate period of time, a large change in temperature, etc., have occurred which render this advisable. In some applications, e.g. automative, it may be appropriate for the constant to be redetermined each time the apparatus is newly switched on.

According to another aspect of the invention radar apparatus of the kind specified in the first paragraph is characterized in that it further includes means for determining the rate of change of the frequency of at least one of the components corresponding to said given target and adjusting the magnitude of said substantially constant rates in an opposite sense to any deviation of the ratio between said difference and said rate of change from a given value, to thereby reduce said deviation.

Because the ratio between the quantities $(f_1 - f_2)$ and $df/dt$ is a measure of the aforesaid constant of proportionality, and because the aforesaid constant of proportionality is itself inversely proportional to the sweep rate $\alpha$, any deviation of said ratio from a given value is an indication of how $\alpha$ would have to be adjusted in order that said ratio should have the given value. Thus, an alternative to using said ratio to actually calculate the aforesaid constant of proportionality is to use any deviation of said ratio from the given value to adjust $\alpha$ in such a sense as to cause the ratio to approach the given value. This will in effect cause both $\alpha$ and the constant of proportionality to themselves approach predetermined specific values (each of which includes the "given value" as a factor). The latter of these is then usable in calculating the range of a target from the range-dependent portion of the beat frequency components corresponding to that target.

BRIEF DESCRIPTION OF THE DRAWING

An embodiment of the invention will now be described, by way of example, with reference to the accompanying diagrammatic drawing figures in which.

DESCRIPTION OF THE PREFERRED EMBODIMENT

Figure 1:
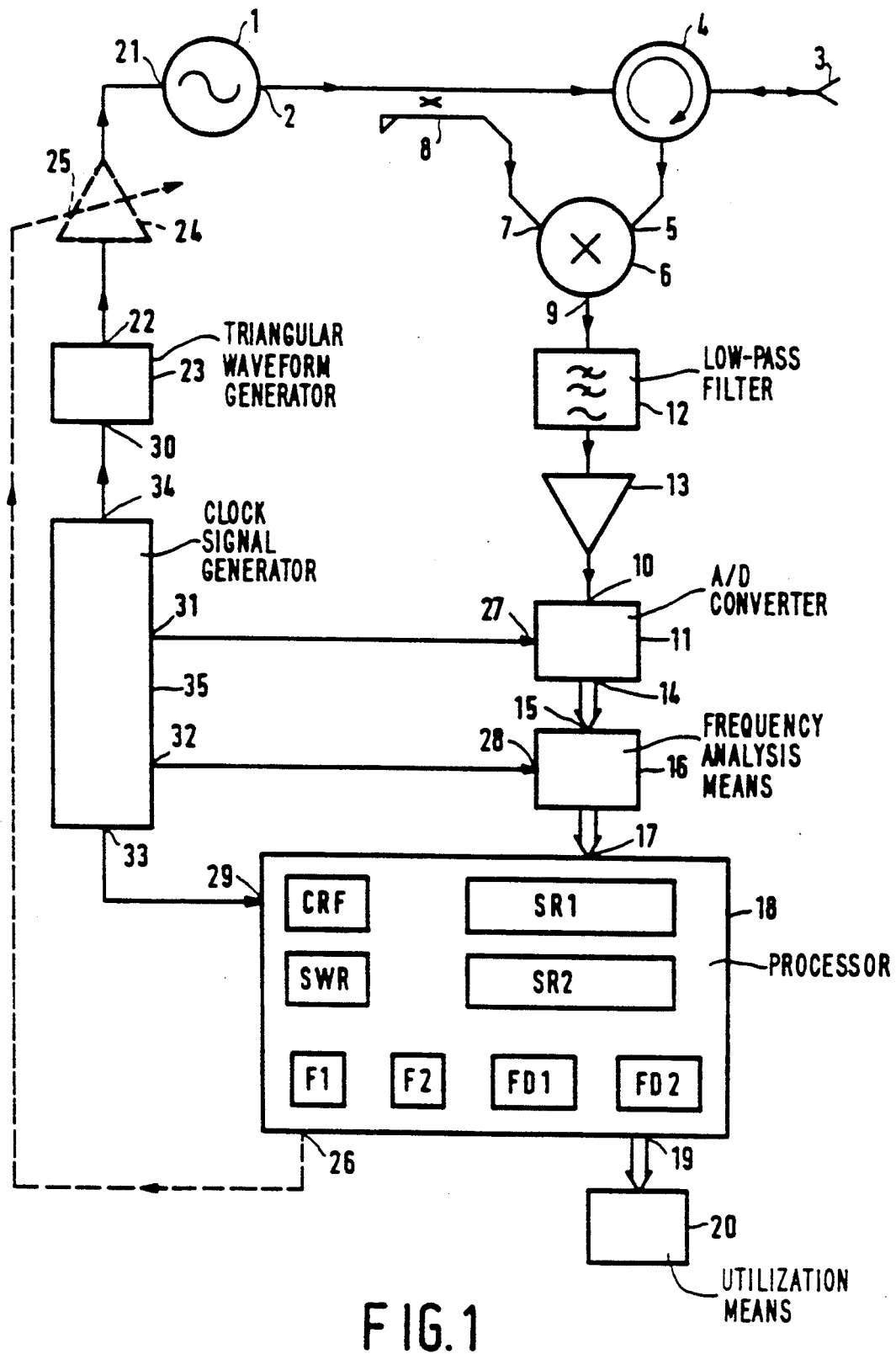
FIG. 1 is a block diagram of a preferred embodiment.

In FIG. 1, FMCW (Frequency Modulated Continuous Wave) radar apparatus comprises a controllable-frequency RF signal generator 1 the output 2 of which is coupled to a transmit/receive aerial 3 via a circulator 4. Signals received by the aerial 3 are fed to a first input 5 of a mixer 6 via the circulator 4. A second input 7 of mixer 6 is fed with a sample of the transmitted signal via a coupler 8. The output 9 of mixer 6 is coupled to the input 10 of an analogue-to-digital (A/D) converter 11 via a low-pass filter 12 and an amplifier 13. The output 14 of converter 11 is coupled to the input 15 of frequency analysis means 16 which in the present example is constituted by a Fast Fourier Transform (FFT)—calculating arrangement. The FFTs calculated by arrangement 16 are fed to the data input 17 of a data processing arrangement 18 which is constituted by a suitably programmed microcomputer. Processor 18 includes a pair of shift-registers SR1 and SR2 respectively, and storage locations CRF (for a flag), SWR, F1, F2, FD1 and FD2. It has a data output 19 which is coupled to utilisation means 20.

Generator 1 has a frequency control signal input 21 which is fed with a frequency control signal from the output 22 of a triangular waveform generator 23. A variable gain amplifier 24 (shown in dashed lines) having a gain control signal input 25 fed from an output 26 of processor 18 may be included between the output 22 of generator 23 and the input 21 of generator 1. A/D converter 11, FFT-calculating arrangement 16, processing arrangement 18, and triangular waveform generator 23 have timing or clock signal inputs 27, 28, 29 and 30 respectively which are fed with suitable timing or clock signals from outputs 31,32,33 and 34 respectively of a timing or clock signal generator 35.

In operation, control of RF signal generator 1 by the output signal of triangular waveform generator 23 results in the transmission from aerial 3 of a radio signal the frequency of which repeatedly sweeps from a first frequency to a second frequency and back again to the first frequency at a substantially constant rate $\alpha$. Any of the transmitted signal which is reflected back to the aerial 3 by a target is fed to input 5 of mixer 6 in which it is mixed with a sample of the currently transmitted signal (fed to input 7) to produce a beat or difference frequency signal at the mixer output 9. If sweep end-effects and higher-order terms are neglected the beat frequency $f_1$ or $f_2$ due to a target at a range r is given by $$f_1 = 2\alpha r/c - f_d$$

(from equation (1A)) when it is due to upward frequency sweeps of the transmitted signal, and by $$f_2 = 2\alpha r/c + f_d$$

(from equation (1B)) when it is due to downward frequency sweeps of the transmitted signal, where $f_d$ is the Doppler frequency shift due to the radial motion (if any) of the target relative to the radar apparatus.

The beat or difference frequency signal produced by mixer 6 is low-pass filtered by filter 12, amplified by amplifier 13, converted to digital form by converter 11, and frequency-analysed by arrangement 16. The output signals of timing or clock signal generator 35 are such that one analysis is performed (one FFT is calculated) for each upward and each downward frequency ramp of the transmitted signal so that, if a target at range r is "seen" by aerial 3, the FFT-calculating arrangement 16 will alternately indicate the corresponding frequencies $f_1$ and $f_2$ at its output. These indications are processed by processor 18 in a manner illustrated in the flow diagrams of FIGS. 2 and 3 of the drawings. For the purpose of these flow diagrams it has been assumed, as an example, that the radar apparatus is intended to be employed as part of a so-called "intelligent cruise control system" for a road vehicle, and that range versus beat frequency calibration as referred to previously is arranged to be performed each time the apparatus is newly switched on. A consequence of the automative application is that the range of only the nearest target ahead of the vehicle is of interest.

Figure 2:
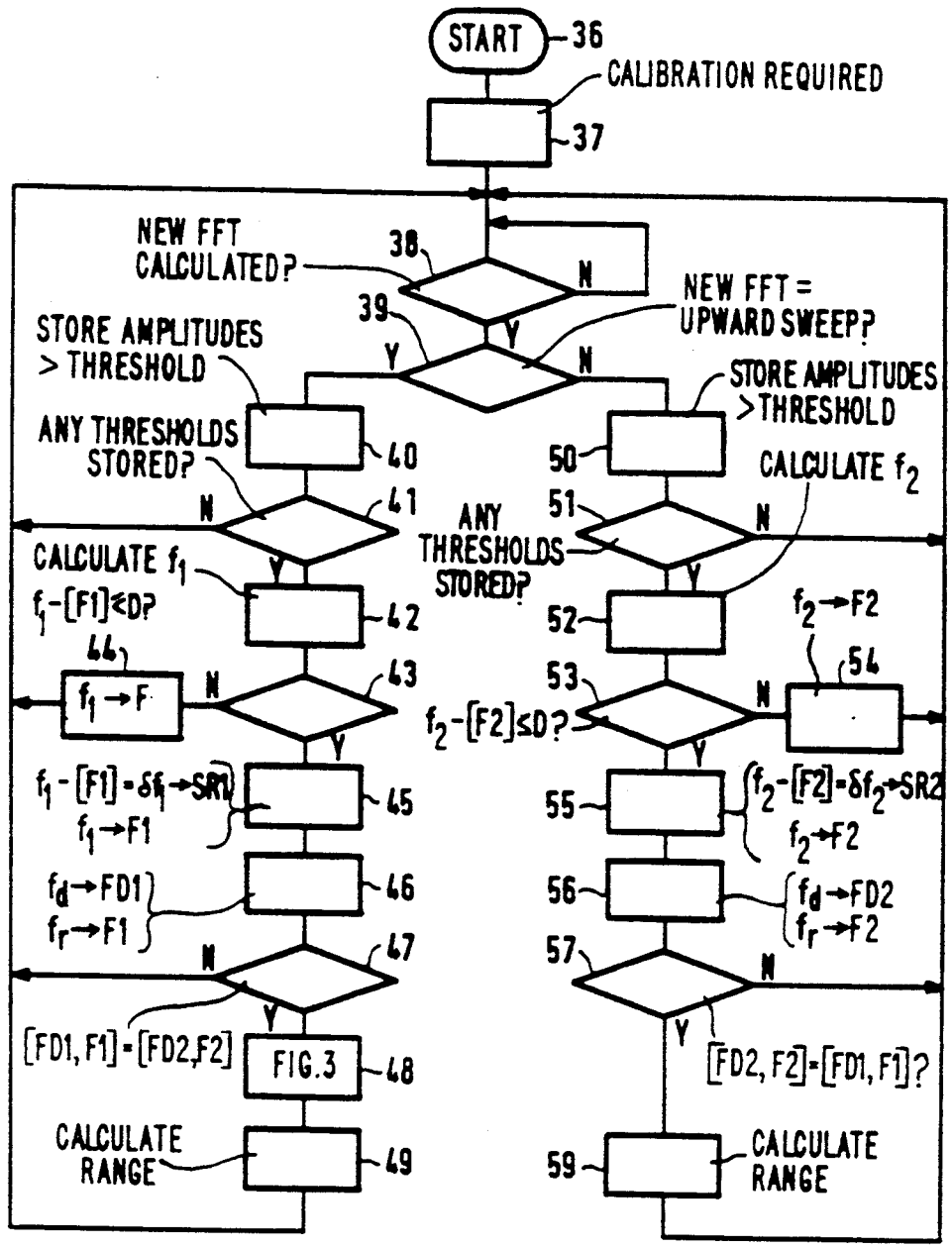
FIG. 2 is a flow diagram of operations performed in a data processing arrangement included in the embodiment of FIG. 1.

In the flow diagram of FIG. 2 the various blocks have the following significances:

36—Start

37—Raise "calibration required" flag CRF. Store nominal value of frequency sweep rate $\alpha$ in storage location SWR.

38—Has a new FFT been calculated?

39—Does the new FFT correspond to an upward frequency sweep of the transmitted signal?

40—Starting from the point of the new FFT corresponding to the lowest range of beat frequencies test each successive point in turn for whether the corresponding amplitude exceeds a predetermined threshold. If and when such a point n1 is found store the corresponding thresholded amplitude $A_{n1}$ together with the centre $f_{n2}$ of the corresponding frequency range and do the same for each succeeding point until a point n2+1 is reached for which the corresponding amplitude does not exceed the relevant threshold.

41—Have any thresholded amplitudes been stored in step 40?

42—Calculate the frequency $f_1$ corresponding to the "centre-of-gravity" of the amplitudes stored in step 40.

43—Is the difference between the frequency $f_1$ calculated in step 42 and the content of storage location F1 (the result of the calculation performed in the immediately preceding step 42 (if any)) not greater than a predetermined amount D.

44—Clear shift register SR1. Store the frequency $f_1$ calculated in step 42 in storage location F1.

45—Subtract the content of storage location F1 from the frequency $f_1$ calculated in step 42 and store the result $\delta f_1$ in shift register SR1. Store the frequency $f_1$ calculated in step 42 in storage location F1. Calculate mean value $\delta f_1$ of the results presently stored in shift register SR1.

46—Calculate expected Doppler shift $f_d$ due to the relevant radar target using, inter alia, the mean value $\delta f_1$ calculated in step 45 and store result in storage location FD1. Calculate from this result and the frequency $f_1$ calculated in step 42 the expected range-dependent portion $f_r$ of the beat frequency due to the relevant target and store this in storage location F1 ($f_r = f_1 + f_d$).

47—Are the contents of storage locations FD1 and F1 substantially equal to the contents of storage locations FD2 and F2 respectively?

Figure 3:
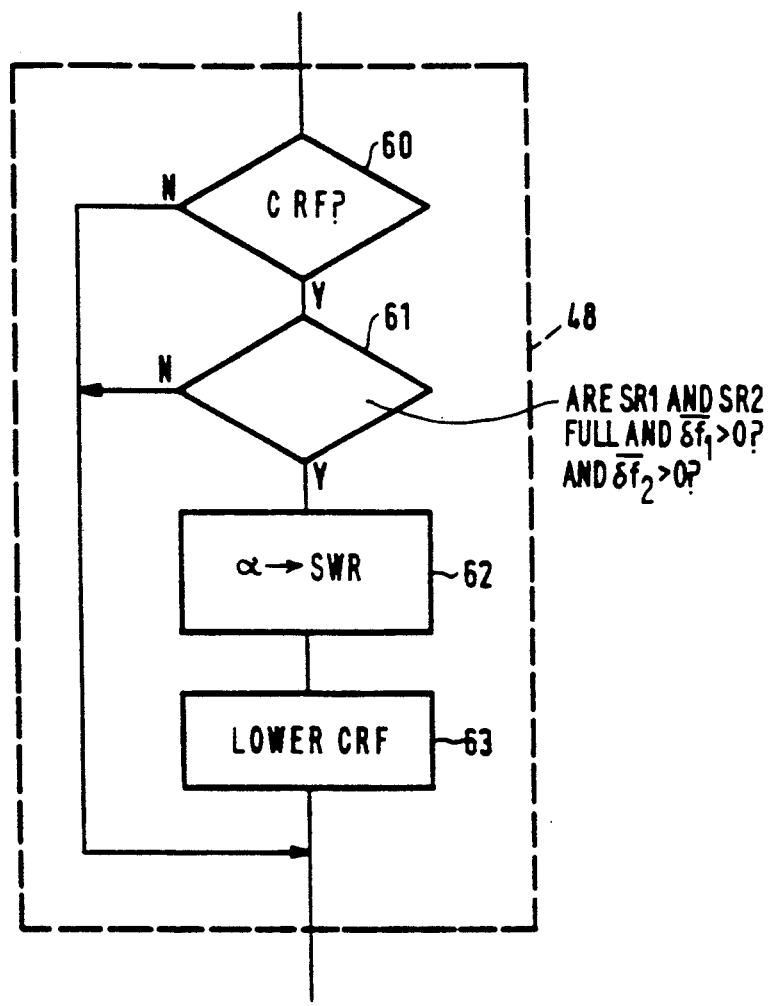
FIG. 3 shows part of the flow diagram of FIG. 2 in more detail.

48—Routine of FIG. 3.

49—Calculate range of the relevant radar target from, inter alia, the average $(f_1+f_2)/2$ of the contents of storage locations F1 and F2 and output result to port 19.

50—Same as 40.

51—Have any thresholded amplitudes been stored in step 50?

52—Calculate the frequency $f_2$ corresponding to the "centre-of-gravity of the amplitudes stored in step 50.

53—Is the difference between the frequency $f_2$ calculated in step 52 and the content of storage location F2 not greater than a predetermined amount D?

54—Clear shift register SR2. Store the frequency $f_2$ calculated in step 52 in storage location F2.

55—Subtract the content of storage location F2 from the frequency $f_2$ calculated in step 52 and store the result $\delta f_2$ in shift register SR2. Store the frequency $f_2$ calculated in step 52 in storage location F2. Calculate mean value $\delta f_2$ of the results presently stored in shift register SR2.

56—Calculate expected Doppler shift $f_d$ due to the relevant radar target using, inter alia, the mean value $\delta f_2$ calculated in step 55 and store result in storage location FD2. Calculate from this result and the frequency $f_2$ calculated in step 52 the expected range—dependent portion $f_r$ of the beat frequency due to the relevant target and store this in storage location F2. ($f_r = f_2 - f_d$).

57—Are the contents of storage locations FD2 and F2 substantially equal to the contents of storage locations FD1 and F1 respectively?

59—Same as 49.

Neglecting for the moment the block 48, the effect of the sequence of steps shown in FIG. 2 is to cause the data processing arrangement 18 of FIG. 1 to repeatedly calculate the range of the closest-in target (if any)

"seen" by the radar apparatus, and to output this at its port 19 provided that consistency occurs between the calculation results obtained for upward and downward frequency sweeps of the radar output signal. Each part-sequence of steps 40-49 is performed using, basically, the results of spectral analysis of the beat signal obtained for a respective upward frequency sweep, and each part-sequence of steps 50-59 (which is similar except that it contains no counterpart to block 48) is performed using, basically, the results of spectral analysis of the beat signal obtained for a respective downward frequency sweep. For example, when an FFT has been calculated by the arrangement 16 of FIG. 1 in respect of the beat frequency signal arising from an upward sweep of the frequency of the transmitted radar signal the result of test 39 of FIG. 2 is positive (Y). (The upward sweep may be indicated by a signal applied to the input 29 of processor 18 by clock/control signal generator 35). The routine of FIG. 2 therefore proceeds to step 40 which locates, and stores amplitude/frequency data about, the lowest frequency component of the beat-frequency signal (which component may be spread over several points n1 to n2 of the FFT). Provided that such a component is found (positive result of test 41) step 42 calculates the effective frequency or "centre-of-gravity" $f_1$ of this component from the thresholded amplitudes $A_{n1}$ to $A_{n2}$ of the relevant FFT points using the formula $$f_1 = \sum_{n1}^{n2} A_n f_n / \sum_{n1}^{n2} A_n.$$

where $f_n$ is the frequency corresponding to FFT point n. Step 43 then tests whether the frequency $f_1$ is likely to correspond to the same radar target as the frequency, stored in storage location F1, similarly calculated for the immediately preceding upward frequency sweep of the radar output signal (on the basis that the beat frequency component is unlikely to have moved in frequency by more than an amount D during one repetition period of the upward sweeps). If the result of this test is negative (N) step 44 causes shift register SR1 (which stores data about the old target) to be cleared on the basis that a new target is now in prospect, and the newly calculated frequency $f_1$ is substituted for the previous content of storage location F1. If on the other hand the result of test 43 is positive, step 45 causes the change $\delta f_1$ in the frequency of the relevant frequency component which has occurred between the two frequency sweeps to be calculated (this being a measure of the change in range of the relevant target which has occurred during this (known) time $\delta t$ and hence of the radial velocity of the target) and be stored in shift register SR1. Shift register SR1, which has a capacity N say, therefore stores at any given time the changes $\delta f_1$ which have occurred in the value of $f_1$ between each of the N previous upward frequency sweeps of the transmitted signal (provided that at least N+1 such sweeps have occurred while the relevant target was the closest "seen" by the radar; otherwise fewer than N values will be present). Step 45 moreover causes the average $\delta f_1$ of the values $\delta f_1$ presently stored in register SR1 to be calculated (this being a measure of the average radial velocity of the relevant target over the period containing the last N+1 upward frequency sweeps at most) and also causes the latest value of $f_1$ calculated in step 42 to be substituted for any present contents of storage location F1.

The necessary data thus having been established step 46 then calculates the expected Doppler shift of the relevant target using the formula $$f_d = -f_o(\delta f_1/\delta t)/\alpha \qquad (8)$$

where $f_o$ is the centre-frequency of the upward frequency sweeps of the radar signal, $\delta t$ is the period of these upward sweeps and $\alpha$ (stored in storage location SWR) is the at least nominal rate of change of frequency during these upward sweeps, and substitutes this for any present contents of storage location FD1. (Formula (8) is obtainable by eliminating the target velocity v from between equation (4) and the standard formula for Doppler frequency shift: $f_d = 2f_o v/c$). Step 46 moreover calculates from this value of $f_d$ and the current value of $f_1$ (stored in location F1) the expected range-dependent portion $f_r$ of $f_1$, and substitutes the result for any present contents of storage location F1.

As mentioned previously, the part-sequence of steps 50-59 is broadly similar to the part-sequence of steps 40-49 but is performed in respect of data derived from downward frequency sweeps of the radar output signal. Storage locations FD2 and F2 correspond to locations FD1 and F1 but in respect of the part-sequence 50-59, i.e. they too become loaded with an expected Doppler shift $f_d$ and an expected range-dependent portion $f_r$ of a beat frequency component respectively each time step 56 (which corresponds to step 46) is performed. Unless there has been a change of target between the last two frequency sweeps the contents of the storage locations FD1, FD2, F1 and F2 should correspond to the same target, i.e. the contents of locations FD1 and FD2 should be substantially equal to each other, as should the contents of locations F1 and F2. After step 46 has been completed step 47 tests whether this substantial equality is present. If it is, and after the operations signified by block 48 have been performed, step 49 causes the processor 18 to calculate the range r of the relevant target using equation (2) together with the contents of storage locations F1,F2 and SWR ($f_1$, $f_2$ and $\alpha$ respectively) and present this to its output 19.

As discussed previously, the fact that equation (2) includes the frequency sweep rate or frequency ramp slope $\alpha$ means that, unless further steps are taken, the target ranges calculated in steps 49 and 59 are subject to appreciable uncertainties/inaccuracies due to uncertainty in the actual value of $\alpha$ as given by the output signal waveform of the triangular wave generator 23 of FIG. 1 and the frequency versus control voltage characteristic of oscillator 1. To overcome this problem the radar apparatus is periodically calibrated (in the present case after each new switch-on); the actual value of $\alpha$ is determined from target returns received by the radar so that it can be used subsequently in steps 49 and 59 as a factor in the constant of proportionality $c/2\alpha$ between r and $(f_1+f_2)/2$ in equation (2). To this end the steps indicated by block 48 in FIG. 2 and illustrated in more detail in FIG. 3 are performed once (in the present example) after each new switch-on of the radar, this being in response to flag CRF being raised in step 37. In FIG. 3 the various blocks have the following significances:

60—Is flag CRF raised?

61—Are both shift-registers SR1 and SR2 full and, if so, are the averages $\delta f_1$ and $\delta f_2$ of their respective contents non-zero?

62—Calculate the mean value of the contents of shift registers SR1 and SR2, the difference $f_1 - f_2$ between the contents of storage locations F1 and F2 and hence the value of frequency sweep rate $\alpha$, and substitute this for the present contents of storage location SWR.

63—Lower flag CRF.

Thus, each time the radar apparatus is newly switched-on and "calibration required" flag CRF is in consequence raised in step 37, test 60 initially yields a positive result (Y) each time the part-sequence of steps 40-49 is subsequently run-through. The result of test 61 is, however, negative (N) for at least the first N of these run-throughs, so that steps 62 and 63 are skipped. Eventually each of the shift-registers SR1 and SR2 will, virtually certainly, become loaded with its full complement of N values $\delta f_1$ and $\delta f_2$ respectively relating to a single radially moving target, at which point test 61 yields a positive result. The routine then proceeds to step 62 in which the actual value of $\alpha$ is calculated from, inter alia, the contents of the shift registers SR1 and SR2 and the storage locations F1 and F2 and substituted for the nominal value at present in storage location SWR. From equations (1) and (7)

$$\alpha = 2f_o(df/dt)/(f_1 - f_2) \quad (9)$$

where $f_o$ is the centre frequency of the upward and downward frequency sweeps of the radar transmitted signal, $f_1$ and $f_2$ are the contents of the storage locations F1 and F2 respectively, and $df/dt$ is to a first approximation equal to $\delta f/\delta t$ where $\delta f$ is the average $(\delta f_1 + \delta f_2)/2$ of the contents of shift registers SR1 and SR2 and $\delta t$ is the period of the upward and downward frequency sweeps i.e. of the triangular output waveform of the generator 23 of FIG. 1. Step 63 then causes the flag CRF to be lowered, ensuring that the sequence of steps 61-63 will next be performed only after the radar apparatus has been deactivated and then activated once again.

When steps 60-63 have been carried out the value of $\alpha$ used in the subsequent calculation steps 49 and 59 will be that calculated in step 62, i.e. $2f_o(\delta f/\delta t)/(f_1 - f_2)$. The calculation performed in steps 49 and 59 takes the form of equation (2), i.e.

$$\begin{aligned} r &= c(f_1 + f_2)/4\alpha \quad \text{(equation (11))} \\ &= cf_r/2\alpha \\ &= Kf_r \text{ say,} \end{aligned}$$

where K, the constant of proportionality between range r and the range-dependent portion $f_r$ of the beat frequency due to the relevant target, is given by $K = c/2\alpha = c(f_1 - f_2)/4f_o(\delta f/\delta t)$. It will be seen from equation (3) that $c(f_2 - f_1)/4f_o$ is a measure of the radial velocity v of the target employed when the value of $\alpha$ was being determined. Thus the value of K which is used after step 62 has been carried out is equal to the ratio of this measure of the radial velocity v to the rate of change $\delta f/\delta t$ of the beat frequency components due to the same target.

If the radar apparatus so far described is included, for example, in a so-called "intelligent cruise control" system in a road vehicle, the utilisation means 20 of FIG. 1 may comprise, in a manner known per se, e.g. from EP-A-145989 and EP-A-146851 which are incorporated herein by reference, vehicle speed control means, e.g. throttle control means which responds to the range data appearing at the output port 19 of the data processing arrangement 18 by controlling the vehicle throttle in such a way that the distance between the vehicle and the "target" sensed by the radar (which will normally be the vehicle in front) is maintained substantially constant at a predetermined value or at least is not allowed to decrease substantially below a predetermined value (which values will normally be higher the higher the speed of the vehicle is at the relevant time).

An alternative to replacing the nominal value of $\alpha$ in storage location SWR by the actual value calculated in step 62 is to arrange that processing arrangement 18 compares the calculated value with the nominal value and that the frequency-sweep rate of the output signal of generator 1 is adjusted in a sense such as to reduce any difference between the two. To this end the variable gain amplifier 24 shown in dashed lines in FIG. 1 may be included between the output 22 of triangular wave generator 23 and the control input 21 of generator 1, the gain control input 25 of amplifier 24 then being fed with a control signal from output 26 of processor 18. Processor 18 may then be programmed, for example, to subtract the actual value of $\alpha$ calculated in step 62 from the nominal value present in storage location SWR and adjust any d.c. signal present at its output 26 by an amount which is proportional to the magnitude of the result and in a sense which is such as to increase the gain of amplifier 24 (and hence $\alpha$) if the result is positive and to decrease the gain of amplifier 24 (and hence $\alpha$) if the result is negative. Any adjustment of $\alpha$ in this way should obviously be repeated until the actual value calculated in step 62 becomes equal to the nominal value to within permissible tolerance limits, which equality may be ascertained by means of an appropriate test replacing test 60 of FIG. 3.

Simple adjustment of the frequency sweep rate $\alpha$ of the output signal of generator 1 towards a predetermined value does not in fact require actual calculation of $\alpha$ at all. It will be seen from equation (9) that, but for the factor $2f_o$ (which in many circumstances will be known very accurately) the sweep rate $\alpha$ is given purely by the ratio $(df/dt)/(f_1 - f_2)$. Thus, in a given radar apparatus having a known $f_o$, any required value of $\alpha$ will correspond to a particular value of this ratio. Thus simple determination of the values of $df/dt$, $f_1$ and $f_2$ corresponding to a given radially moving target in the manner described hereinbefore and calculation therefrom of the ratio $(df/dt)/(f_1 - f_2)$ will provide an indication of whether $\alpha$ has the desired value and, if not, in which direction it should be adjusted to become more nearly equal to the desired value.

Although in the embodiment described the quantity $\delta f$ is taken as the average of the contents of the shift registers SR1 and SR2, it will be evident that, although desirable, this is not essential; the whole or part of the contents of only one of these shift registers may be taken into account in this respect, if desired.

From reading the present disclosure, other modifications will be apparent to persons skilled in the art. Such modifications may involve other features which are already known in the design, manufacture and use of radar apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. Radar apparatus comprising a transmitter for a radio signal the frequency of which repeatedly sweeps from a first frequency to a second frequency at a first substantially constant rate and also sweeps from a third frequency to a fourth frequency at a substantially constant rate which has the same magnitude as, but is of opposite sign to, said first substantially constant rate, a mixer for mixing any return signal received back at the apparatus after reflection by a target with a sample of the transmitted signal to produce a beat signal the frequency spectrum of which has a component corresponding to the target, a frequency analyser for analysing said frequency spectrum to determine the frequency of said component, and means for determining the difference between the frequencies of the component corresponding to a given radially moving target arising from a sweep in the frequency of the transmitted signal from the first frequency to the second frequency and the component corresponding to the same target arising from a sweep in the frequency of the transmitted signal from the third frequency to the fourth frequency, characterized in that the radar apparatus further includes calibration means for determining a constant of proportionality between the range of a target and a range-dependent portion of the frequency of said component corresponding to that target, said calibration means comprising means for determining the rate of change of the frequency of at least one of the components corresponding to said given target and determining said constant as being the ratio between the radial velocity of said given target as indicated by said difference and said rate of change.

2. Radar apparatus as claimed in claim 1, including means for determining the mean value of the frequencies of the component corresponding to a further target arising from a sweep in the frequency of the transmitted signal from the first frequency to the second frequency and the component corresponding to said further target arising from a sweep in the frequency of the transmitted signal from the third frequency to the fourth frequency and determining the range of said further target as the product of said mean value and said constant.

3. Radar apparatus comprising a transmitter for a radio signal the frequency of which repeatedly sweeps from a first frequency to a second frequency at a first substantially constant rate and also sweeps from a third frequency to a fourth frequency at a substantially constant rate which has the same magnitude as, but is of opposite sign to, said first substantially constant rate, a mixer for mixing any return signal received back at the apparatus after reflection by a target with a sample of the transmitted signal to produce a beat signal the frequency spectrum of which has a component corresponding to the target, a frequency analyser for analysing said frequency spectrum to determine the frequency of said component, and means for determining the difference between the frequencies of the component corresponding to a given radially moving target arising from a sweep in the frequency of the transmitted signal from the first frequency to the second frequency and the component corresponding to the same target arising from a sweep in the frequency of the transmitted signal from the third frequency to the fourth frequency, characterized in that the radar apparatus further includes means for determining the rate of change of the frequency of at least one of the components corresponding to said given target and adjusting the magnitude of said substantially constant rates in an opposite sense to any deviation of the ratio between said difference and said rate of change from a given value, to thereby reduce said deviation.

4. Radar apparatus as claimed in claim 3, including means for determining the mean value of the frequencies of the component corresponding to a further target arising from a sweep in the frequency of the transmitted signal from the first frequency to the second frequency and the component corresponding to said further target arising from a sweep in the frequency of the transmitted signal from the third frequency to the fourth frequency and determining the range of said further target as the product of said mean value and a constant which includes said given value as a factor.

5. Radar apparatus as claimed in claim 2 or claim 4, included in a land vehicle which includes vehicle speed control means for responding to the determined range by controlling the vehicle speed in such manner to maintain the separation between said vehicle and said further target at at least a predetermined value.

* * * * *